May 17, 1932.  E. E. SEE  1,858,564

LIGHTING DEVICE FOR SEWING MACHINES

Filed April 14, 1930   2 Sheets-Sheet 1

E. E. SEE.  Inventor

By David O. Barnell,

Attorney

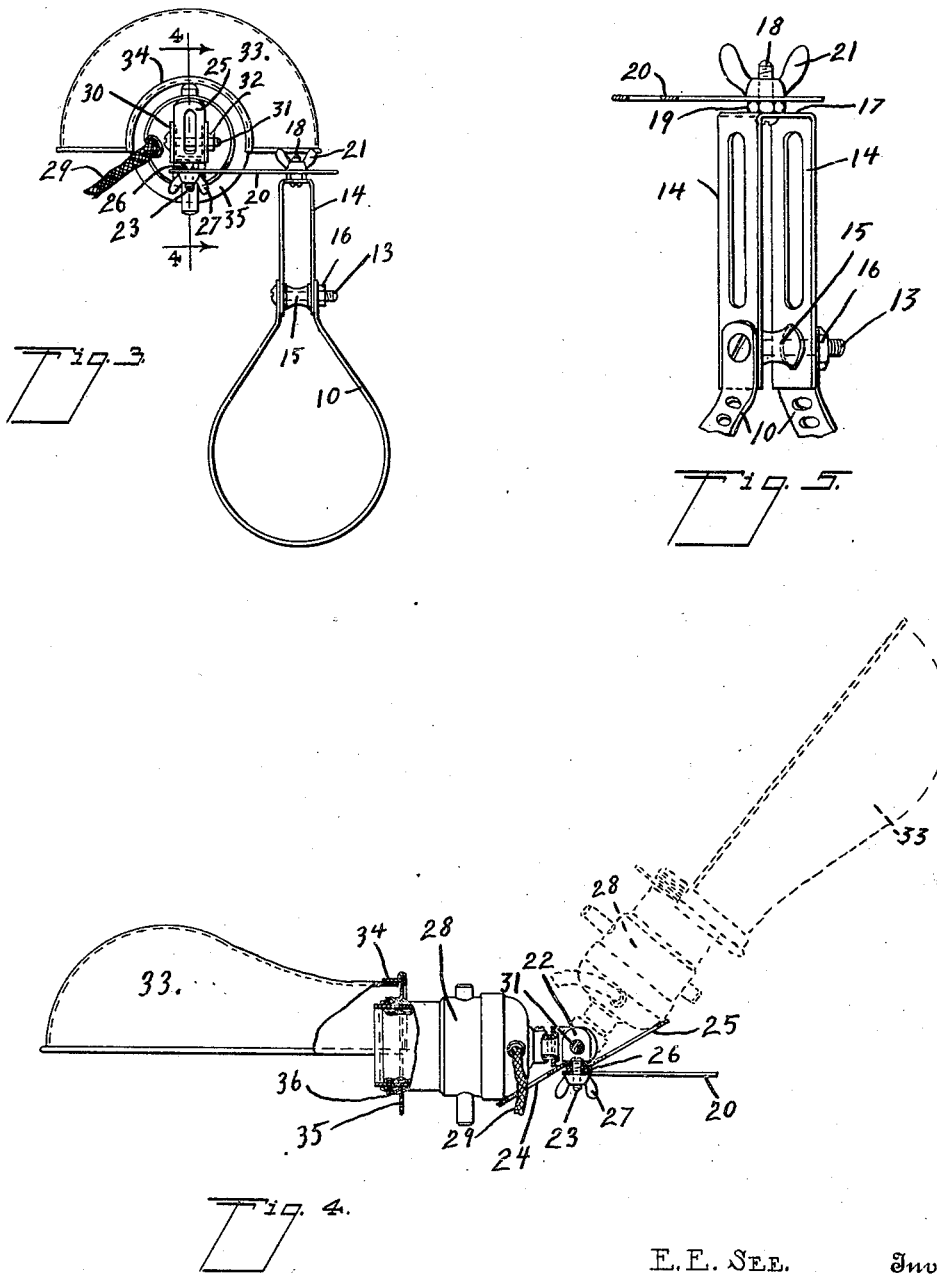

Patented May 17, 1932

1,858,564

UNITED STATES PATENT OFFICE

EDWARD E. SEE, OF OMAHA, NEBRASKA

LIGHTING DEVICE FOR SEWING MACHINES

Application filed April 14, 1930. Serial No. 444,101.

This invention relates to lighting devices for sewing machines. In devices of this character, particularly when attached to sewing machines operated at a high rate of speed, the life of the lamp filament is greatly shortened, due to the vibration of the machine which sets up a sympathetic vibration of the filament that soon causes its destruction.

It is therefore the object of my invention to provide a lighting device for sewing machines of simple, durable, and inexpensive construction that will so dampen and absorb the vibration set up by the machine that the life of the filament will not be materially shortened.

It is a further object to provide a device of this character that has a support for the light that is flexible longitudinally in a plurality of intersecting planes and also with torsional flexibility of the various parts of the support, both being for the purpose of damping and reducing the amplitude of the vibrations imparted by the machine so that they will be reduced to a minimum before reaching the lamp filament. Additional vibration damping is effected by the weight of the floating parts which increase the inertia of said floating parts so that the natural vibration of the support is slow relative to that of the machine and of the filament. An adjustment of the support longitudinally lengthens or shortens it to thereby vary its natural period of vibration and avoid synchronous vibrations that may be set up in it and the lamp filament by the machine.

A still further object is to provide a lighting device adjustable longitudinally of the horizontal arm of the sewing machine gooseneck and also having a variety of adjustments of the support and the shade to permit the light to be thrown at any desired angle and particularly so that it may be directed into the slot of the presser-foot to insure precision and accuracy in doing fine work, such as design sewing, while at the same time protecting the eyes from objectionable heat and glare.

A further object is to provide a shade for the electric lamp so attached to the lamp-socket that it is readily removable to facilitate insertion of the lamp or its removal from the socket.

I attain these objects by the device illustrated in the accompanying drawings, in which:

Fig. 3 is an end elevation of the device detached from the arm.

Fig. 4 is a side elevation with a portion of the shade and socket broken away to show the method of attachment of the shade to the socket and also showing, in dotted lines, the shade and socket tilted up and back.

Fig. 5 is a perspective view of the upright member of the support showing the attachment of the ends of the perforated clamp strap and a portion of the horizontal support arm.

Figure 1:
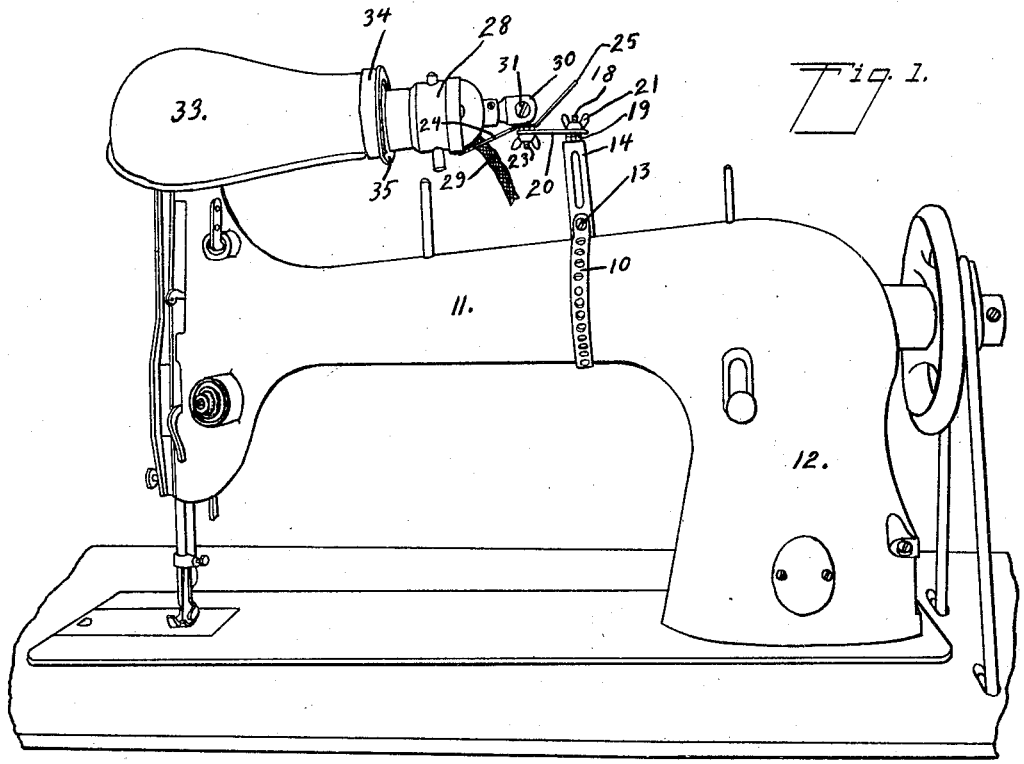
Fig. 1 is a perspective view of the lighting device attached to the horizontal arm of a sewing machine gooseneck and positioned so that the light will be cast on the operative sewing parts of the machine and on the work that may be handled.
Figure 2:
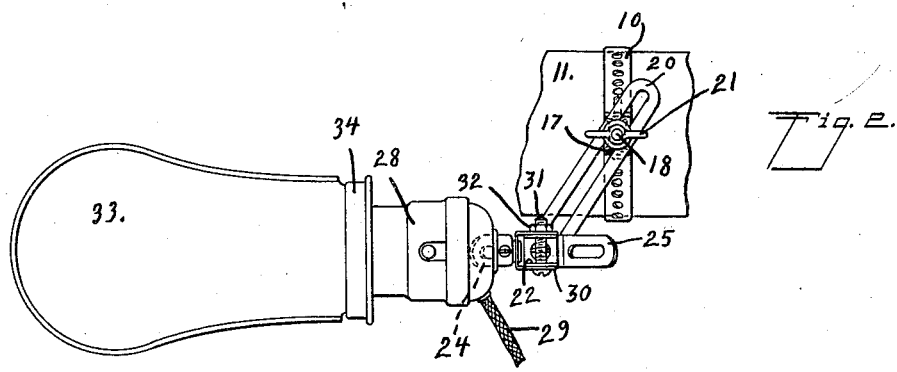
Fig. 2 is a plan view of the lighting device showing a portion of the horizontal arm to which it is attached.

In carrying out my invention according to the illustrated embodiment, I provide a jointed support including a clamp comprising a looped metal strap 10 adapted to embrace the horizontal arm 11 of a sewing machine gooseneck 12. The strap is perforated throughout its length by spaced openings to give it greater flexibility and to provide means for adjusting its effective length to fit sewing machine goosenecks of different sizes. A bolt 13 extends through the ends of the strap 10 and the lower ends of the legs 14 of an inverted U shaped upright support member, said legs being spaced apart by a sleeve 15 on the bolt 13. A nut 16 on the bolt serves to tighten the strap on the arm 11 and hold the clamp and upright member rigidly together. The horizontal upper portion 17 of the upright member has an aperture in which is received an upwardly projecting bolt 18 secured in the part 17 by a nut 19. The upper end of said bolt 18 supports slidably and rotatably a longitudinally slotted horizontal support arm 20 and has a wing-nut 21 for securing the arm at any desired adjustment relative to the upright member. By means of the longitudinal adjustment the length of the support may be varied, a feature particularly important for securing a different natural period of vibration in the support to break up sympathetic vibration therein caused by the machine. By the longitudinal adjustment in combination with the swinging adjustment of the arm about the axis of the bolt 18 the supported lamp may be positioned to best direct the light therefrom onto the presser-foot and the needle of the machine and the fabric adjoining the same. A U-shaped bracket, having upwardly extending ears 22, is provided with an aperture in the horizontal lower portion in which is received a downwardly projecting bolt 23. On the bolt, beneath the bracket, is a stop member having a downwardly and forwardly extending slotted arm 24 and an upwardly and rearwardly extending slotted arm 25. The bracket and the stop member are secured rigidly together on the bolt 23 by a nut 26. The lower end of the bolt 23 is received in an aperture in the horizontal arm 20 adjacent to the free end thereof, said bracket and stop being adapted to be rotated relative to the horizontal arm but being normally held against movement by a wing-nut 27. A lamp-socket 28 of a usual type, provided with a switch and with a conductor cord 29, has a yoke with rearwardly extending ears 30 engaged pivotally with a bolt 31 mounted in the upwardly extending ears 22 of the bracket and held against longitudinal movement by a nut 32. The socket is adapted to be swung from a normal horizontal position, where it rests on the stop-arm 24, to a raised position where it rests on the stop-arm 25 as indicated by the dotted lines in Fig. 4, it being sometimes desirable to so tilt the lamp to a place at which it is out of the way of the operator in threading the machine. A shade 33 is provided for the electric incandescent lamp carried by the socket 28, the open end of the shade having a grooved band 34 which is detachably engaged with an annular disk 35 having a threaded flange 36 secured on swaged threads of the socket. The band 34 embraces slightly more than half the circumference of the disk so that the ends of the band grip or clamp onto the disk just below its widest part and hold the shade firmly in place but permit it to be readily rotated on said disk. The shade is therefore readily removable to facilitate the insertion or removal of the lamp from the socket, a feature that is not found in electric lamp shades now in use. It is to be noted that the legs 14 of the upright member, the horizontal arm 20, and the stop portions 24 and 25 are perforated longitudinally by slots, thus giving said parts greater longitudinal and torsional flexibility. The longitudinal flexibility of each part is in a different plane relative to that of each of the other parts and these planes intersect each other. The plane in which the legs of the upright member will normally flex is substantially transverse to the machine arm 11; that of the arm 20 intersects said plane at an angle determined by the angle at which said arm is adjusted relative to the upright member; and that of the stop arms 24 and 25 intersects the last mentioned plane at an angle determined by the angle at which they are adjusted on the arm 20.

The advantages of this device are that a simple, durable and inexpensive lighting device for sewing machines is provided wherein the vibration of the machine will be dampened and absorbed by the various parts of the support so that they will be practically harmless to the lamp filament by the time they reach said filament. The support is adjustable longitudinally to change the natural period of vibration thereof and break up synchronous vibrations induced by the vibrations of the machine. And the shade of the device is detachably secured to the socket to facilitate the insertion or removal of the lamp bulb.

Having thus described my invention, I claim:

1. In a lighting device for sewing machines, an electric lamp-socket, a bracket to which said socket is pivotally connected to swing about a horizontal axis, the bracket having a resilient stop-arm adapted to yieldingly support the socket in a substantially horizontal position and having another stop-arm adapted to yieldingly support the socket in a raised position, an arm to which said bracket is connected to swing about a vertical axis, an upright support-member to which said arm is swingably connected, and a clamp-member for connecting said upright support-member to the arm of a sewing machine.

2. In a device of the class described, a clamp-member adapted for connection with a support, an upright member connected with said clamp-member, said upright member comprising a plurality of flat substantially parallel laterally spaced resilient elements affording lateral and torsional flexibility in said upright member as a whole, a flat longitudinally slotted arm connected with the upper end of said upright member to swing about an axis longitudinal thereto and to slide transversely thereof, means for holding said arm in adjusted relations to said upright member, and a lamp-socket connected pivotally with the outer end portion of said arm.

3. In a device of the class described, a clamp-member adapted for fixed connection with a support, an upright member connected with said clamp-member and comprising a plurality of longitudinally slotted flat substantially parallel laterally spaced flexible elements, a flat longitudinally slotted arm connected with the upper end of said upright member to swing about an axis longitudinal thereto and to slide transversely thereof, means for holding said arm in adjusted relations to said upright member, a bracket connected with the outer end of said arm and swingable about a vertical axis, a lamp-socket connected with said bracket to swing about a horizontal axis, and resilient stop means for yieldingly supporting said socket in a substantially horizontal position and in a raised position.

EDWARD E. SEE.